United States Patent
Huang et al.

(10) Patent No.: US 12,008,623 B2
(45) Date of Patent: Jun. 11, 2024

(54) SYSTEMS AND METHODS FOR USER PLATFORM BASED RECOMMENDATIONS

(71) Applicant: Capital One Services, LLC, McLean, VA (US)

(72) Inventors: Jeremy Huang, Plano, TX (US); Michelle Emamdie, McKinney, TX (US); Derek Bumpas, Allen, TX (US); Jiaxin Guo, Plano, TX (US); Qiaochu Tang, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 271 days.

(21) Appl. No.: 17/213,395

(22) Filed: Mar. 26, 2021

(65) Prior Publication Data

US 2022/0309555 A1    Sep. 29, 2022

(51) Int. Cl.
| | | |
|---|---|---|
| *G06Q 30/00* | (2023.01) | |
| *G06F 16/9535* | (2019.01) | |
| *G06F 16/9536* | (2019.01) | |
| *G06Q 30/0601* | (2023.01) | |
| *G06Q 30/0645* | (2023.01) | |

(52) U.S. Cl.
CPC ..... *G06Q 30/0629* (2013.01); *G06F 16/9535* (2019.01); *G06F 16/9536* (2019.01); *G06Q 30/0627* (2013.01); *G06Q 30/0641* (2013.01); *G06Q 30/0645* (2013.01)

(58) Field of Classification Search
CPC ........... G06Q 30/0627; G06Q 30/0641; G06Q 30/0645; G06Q 30/0629; G06F 16/9535; G06F 16/9536
USPC .................................................. 705/26.1–27.2
See application file for complete search history.

(56) References Cited

U.S. PATENT DOCUMENTS

| | | | |
|---|---|---|---|
| 9,697,538 B2 | 7/2017 | Balasubramanian et al. | |
| 9,704,185 B2 | 11/2017 | Cunico et al. | |
| 2014/0279193 A1* | 9/2014 | Westphal | G06Q 30/0631 705/26.7 |
| 2014/0337163 A1 | 11/2014 | Whisnant | |
| 2016/0379260 A1* | 12/2016 | Balasubramanian | G06Q 30/0256 705/14.54 |
| 2018/0089541 A1* | 3/2018 | Stoop | G06V 20/30 |
| 2021/0166103 A1* | 6/2021 | Jackson | G06N 3/088 |

OTHER PUBLICATIONS

V. K. Seetharamu, S. Sathish, A. Kumar and K. Kumar, "A Generic Framework for Recommendations Based on User Data Aggregation," 2016 IEEE International Conference on Web Services (ICWS), San Francisco, CA, USA, 2016, pp. 617-622, doi: 10.1109/ICWS.2016.85. (Year: 2016).*

* cited by examiner

*Primary Examiner* — Anand Loharikar
(74) *Attorney, Agent, or Firm* — Bookoff McAndrews, PLLC

(57) ABSTRACT

Computer-implemented methods and systems include determining vehicle grades for a user by accessing a plurality of user platforms, identifying user-related content linked to the user via the user platforms, extracting user attributes based on the user-related content, applying weights to vehicle attributes in a vehicle recommendation engine, based on the extracted user attributes, generating the vehicle grades based on the weights, and providing the vehicle grades to the user via a vehicle grading platform.

20 Claims, 9 Drawing Sheets

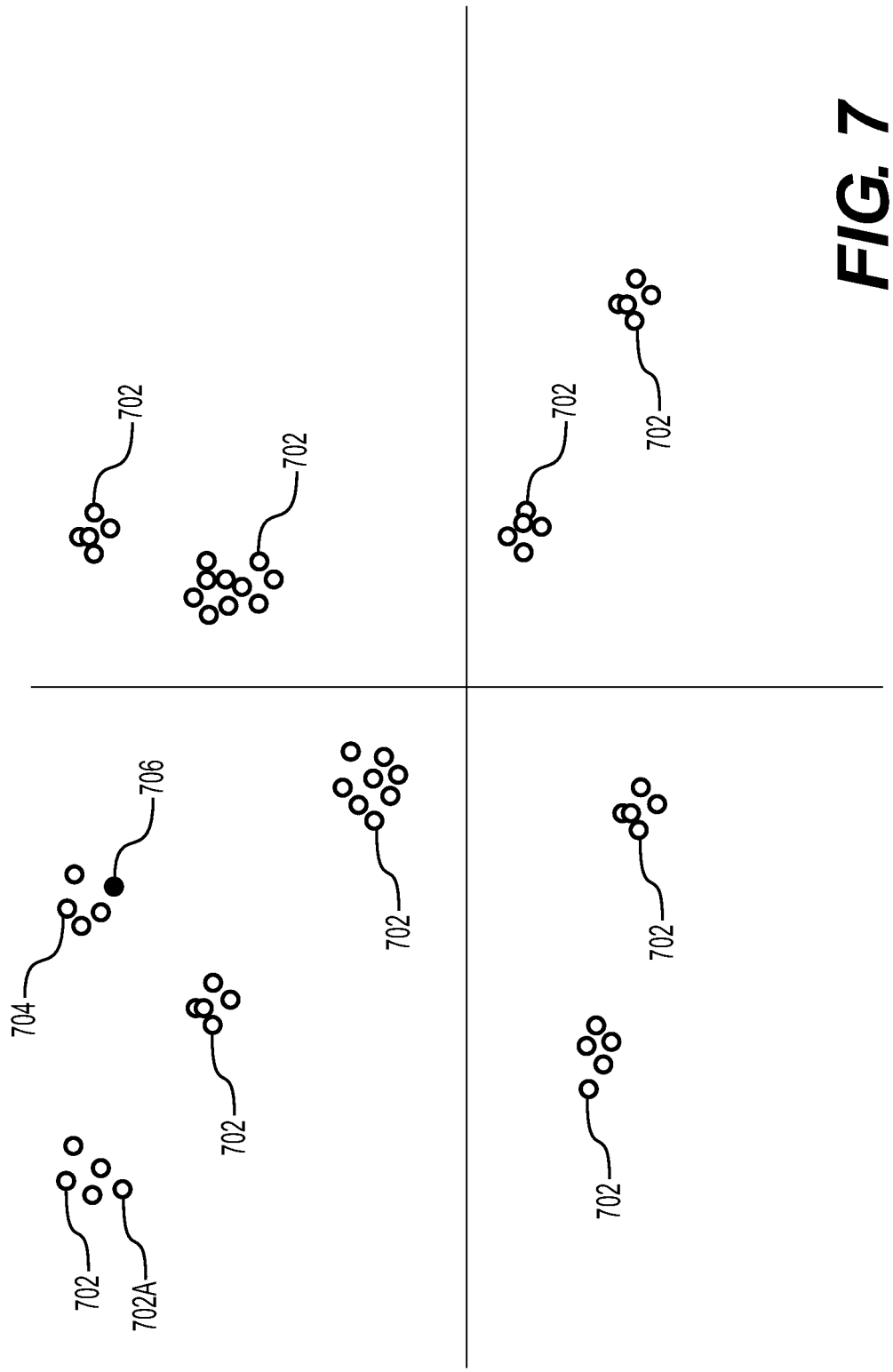

SYSTEMS AND METHODS FOR USER PLATFORM BASED RECOMMENDATIONS

TECHNICAL FIELD

Various embodiments of the present disclosure relate generally to generating recommendations based on user platforms, and more particularly, systems and methods for providing vehicle recommendations based on a user's connection-based media accounts (e.g., social media accounts).

BACKGROUND

Purchasing a vehicle (e.g., a car) can often be an overwhelming experience for a user, especially given the large amount of options available for purchase. Online searching for vehicles can allow a user to filter from pre-determined criteria however, often, the number of such pre-determined criteria can be prohibitive for a user. Filtering based on too many pre-determined criteria can often exclude options that the user is likely to purchase. Current techniques and systems for digitally searching for a vehicle often requires a large amount of search time, a large load on electronic systems to review and provide information about a large inventory of vehicles, and/or buyer frustration due to the difficulty in finding applicable options.

The present disclosure is directed to addressing one or more of the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for determining vehicle grades for a user by accessing a plurality of user platforms, identifying user-related content linked to the user via the user platforms, extracting user attributes based on the user-related content, applying weights to vehicle attributes in a vehicle grading engine, based on the extracted user attributes, generating the vehicle grades based on the weights, and providing the vehicle grades to the user via a vehicle grading platform.

In another aspect, an exemplary embodiment of a computer-implemented method includes generating vehicle grades for a user by accessing a plurality of user platforms, identifying user-related content linked to the user via the user platforms, extracting user attributes based on the user-related content, generating a user attribute vector based on the extracted user attributes, identifying a user cluster from a plurality of attribute clusters, wherein the user cluster is most closely related to the user attribute vector when compared to the plurality of attribute clusters, identifying vehicle acquisitions by other users in the user cluster, generating the vehicle grades based on the vehicle acquisitions by the other users in the user cluster, and providing the vehicle grades to the user.

In another aspect, an exemplary embodiment of a computer-implemented method includes generating product grades for a user by accessing a plurality of user platforms, identifying a plurality of associates connected to the user via the user platforms, identifying associate content linked to the plurality of associates, extracting associate attributes based on the associate content, applying weights to vehicle attributes in a product recommendation engine based on the extracted associate attributes for the plurality of associates, wherein weights based on associate attributes for associates with a greater interaction with the user are greater than weights for associate attributes for associates with a relatively lower interaction with the user, generating the product grades based on the weights, and providing the product grades to the user.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 depicts user clusters, according to one or more embodiments.

Like reference numbers and designations in the various drawings indicate like elements.

DETAILED DESCRIPTION OF EMBODIMENTS

Figure 1:
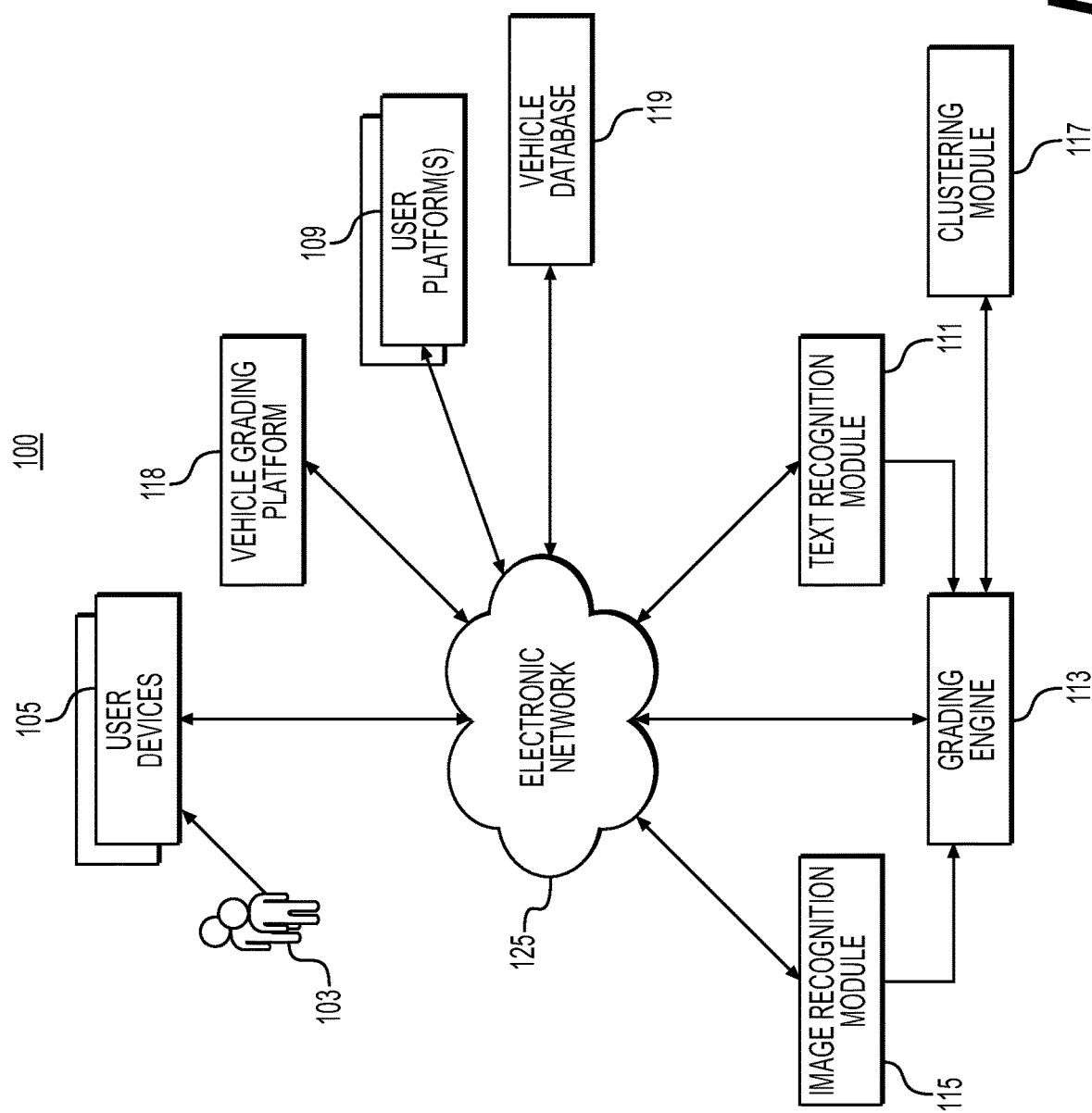
FIG. 1 depicts an exemplary computing environment for generating grades, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

As used herein, a "user platform" may be any account that includes user-generated content, user-viewed content, or content that a given user interacts with. A user platform may be a social media account. A social media account, as applied herein, may be an account where the user is connected to one or more other users. The connection may be an inclusive connection such that the user may be friends with, follow, like, engage with, etc., at least one or more other users. The connection may be public such that the user may have access to, or interact with content or information about one or more other users. The one or more other users may be individuals, companies, entities, groups, movements, parties or the like. As a general example, a user platform may be an account that includes information about a user, content generated by the user (e.g., images, videos, text, etc.), and/or a connection with one or more other users.

As used herein, "user-related content" is content that is associated with a given user based on the content being generated by the user, tagged for the user, and/or content that the user interacts with. For example, user-related content may be the images or videos that user generates using a graphical user interface (GUI) associated with a user platform.

According to implementations of the disclosed subject matter, grades for any consumable good or a service may be generated. Although this disclosure provides vehicle grades as an example, it will be understood that any good or service that has two or more options for the respective good or service may be ranked and provided to a user, as disclosed herein.

One or more user platforms may be accessed to identify user-related content linked to the user via the one or more user platforms. As an example, a user may have two different user platforms, a social account and a professional account, where the user is connected to a plurality of other users via each respective user platform. Access to each of the accounts may be granted to a service, application, software, or the like that includes components such as image recognition module (s), text recognition module(s), and/or a recommendation engine. The access may be granted by the user directly via the service, application, software, etc., or indirectly as a general permission from the user platforms and/or a global access area (e.g., via the user's mobile phone account).

The user-related content may be used to extract user attributes. The user-related content may include tags, metadata, and/or contextual elements that may enable a module to extract the user attributes. Alternatively, or in addition, the user-related content may be analyzed (e.g., image analysis, text analysis) by, for example, a machine learning model, to extract user attributes.

A vehicle recommendation engine may include a plurality of vehicle attributes associated with a vehicle inventory. Each of the ranging categories may be associated with attributes of vehicles, as further disclosed herein. The recommendation engine may apply weights to the vehicle attributes based on the user attributes extracted from on the user-related content. According to a variety of implementations, the weights may be applied using a machine learning model, as further disclosed herein. Based on the weights, vehicle grades may be generated such that one or more vehicles are ranked higher than one or more other vehicles. The vehicle grades may be provided to the user via a vehicle grading platform.

FIG. 1 depicts an exemplary computing environment 100 that may be utilized with techniques presented herein. In some embodiments, the computing environment 100 is, includes, and/or forms a portion of a vehicle grading system. FIG. 1 includes one or more user device(s) 105 associated with one or more users 103, image recognition module 115, text recognition module 111, grading engine 113, clustering module 117, vehicle database 119, and user platform(s) 109 that are part of the computing environment 100. Some or all of the components shown in computing environment 100 may communicate across an electronic network 125. Each user device 105 may be associated with a respective user 103 or multiple users may use the same device 105. A user device 105 may be any electronic device. The user platform(s) 109 may be associated with a user and may connect the user to one or more other users (e.g., a social media user platform). A user 103 may access a user platform(s) 109 using a user device 105 via electronic network 125. The user device 105 may be connected to the electronic network 125 that provides a connection to one or more servers or databases that host the user platform(s) 109.

The image recognition module 115 may receive content from the user platform(s) 109 via electronic network 125. For example, the image recognition module 115 may receive one or more images associated with a user 103 via the user's user platform 109. The image may be an image uploaded or captured by the user 103 (e.g., using user device 105), may be an image that the user 103 engages with (e.g., using user device 105) where an engagement may be any interaction such as a view, a like, an impression, a comment, a message, or the like or a combination thereof. The image recognition module 115 may extract one or more user attributes or data that can be used to determine one or more user attributes. The image recognition module 115 may analyze the image to determine the content of the image by using an image analysis module and/or a machine learning model to determine the content of the image. For example, the image recognition module 115 may determine that a given user-related image includes a dog based on inputting the image into a machine learning model that conducts a pixel by pixel analysis to output that the subject of the image is a dog. The machine learning model may be accessed via electronic network 125 or may be a part of the image recognition module 115.

According to a variety of implementations, the image recognition module 115 may determine (e.g., identify, update, modify, etc.) one or more user attributes based on the content (e.g., image) and/or a set of content (e.g., a plurality of images). The user attributes may be further determined based on context (e.g., time associated with the content, content originator information, content response, messages or statuses associated with the content, content engagement, etc.) associated with the content. The context may be provided by the user platform or may be extrapolated based on information such as metadata, tags, etc. The user attributes may be determined based on the content or set of content by associating the content or set of content with known attributes. Alternatively, or in addition, the user attributes may be determined based on correlating the content or set of content with user activities, interests, preferences, habits, needs, requirements, etc. A machine learning model may be used to input the content or set of content and the context to output one or more user attributes. As an example, a user may engage with an image of a dog via a social media platform.

The image may be analyzed using an image recognition module 115 that may output that the content of the image is a large dog. Additionally, the extent of the interaction (e.g., a like, a like plus a comment, etc.) may also be extracted as context related to the content of the image. Based on the content (e.g., large dog) and the context e.g., extent of interaction), a user attribute may be determined. The user attribute may be that the given user likes large dogs.

According to a variety of implementations, the image recognition module 115 may provide the image data (e.g., that a given image includes a large dog) to the grading engine 113. The image data may be provided to the grading engine 113 along with context (e.g., time associated with the content, content originator information, content response, messages or statuses associated with the content, content engagement, etc.) associated with the content. The grading engine 113 may determine (e.g., identify, update, modify, etc.) one or more user attributes based on the content (e.g., image) and/or a set of content (e.g., a plurality of images). The user attributes may be further determined based on context provided to the grading engine 113.

The text recognition module 111 may receive text from the user platform(s) 109 via electronic network 125. For example, the text recognition module 111 may receive one or more words, terms, excerpts, paragraphs, comments, tags, annotations, etc., associated with a user 103 via the user's user platform 109. The text may be input by the user 103 (e.g., using user device 105), may be text that the user 103 engages with (e.g., using user device 105) where an engagement may be any interaction such as a view, a like, an impression, a comment, a message, or the like or a combination thereof. The text recognition module 111 may extract one or more user attributes or data that can be used to determine one or more user attributes. The text recognition module 111 may analyze the text to determine the content of the text by using a text analysis module and/or a machine learning model to determine the content of the text. For example, the text recognition module 111 may determine that a given user-related comment is related to hiking by inputting the comment into a machine learning model that conducts a word by word analysis to output that at least one subject of the comment (e.g., based on the mention of a trail site). The machine learning model may be accessed via electronic network 125 or may be a part of the text recognition module 111.

According to a variety of implementations, the text recognition module 111 may determine (e.g., identify, update, modify, etc.) one or more user attributes based on the content (e.g., text) and/or a set of content (e.g., a plurality text-based elements). The user attributes may be further determined based on context (e.g., time associated with the content, content originator information, content response, messages or statuses associated with the content, content engagement, etc.) associated with the content. The context may be provided by the user platform or may be extrapolated based on information such as metadata, tags, etc. The user attributes may be determined based on the content or set of content by associating the content or set of content with known attributes. Alternatively, or in addition, the user attributes may be determined based on correlating the content or set of content with user activities, interests, preferences, habits, needs, requirements, etc. A machine learning model may be used to input the content or set of content and the context to output one or more user attributes. As an example, a user may write a comment as a status via a user platform 109. The comment may be analyzed using the text recognition module 111 that may output that the content of the status is related to a hike. Additionally, the extent of the interaction (e.g., a like, a like plus a comment, etc.) may also be extracted as context related to the content of the status. Based on the content (e.g., a hike) and the context (e.g., extent of interaction), a user attribute may be determined. The user attribute may be that the given user likes hikes.

According to a variety of implementations, the text recognition module 111 may provide the text data (e.g., that a given comment is related to hiking) to the grading engine 113. The text data may be provided to the grading engine 113 along with context (e.g., time associated with the content, content originator information, content response, messages or statuses associated with the content, content engagement, etc.) associated with the content. The grading engine 113 may determine (e.g., identify, update, modify, etc.) one or more user attributes based on the content (e.g., text) and/or a set of content (e.g., a plurality of text). The user attributes may be further determined based on context provided to the grading engine 113.

The grading engine 113 may have access to or may store a plurality of vehicle attributes. The vehicle attributes may be related to a plurality of vehicles, such as those provided via a vehicle database 119. The vehicle attributes may enable differentiation between different vehicles. As a simplified example, the vehicle attributes may include vehicle type (e.g., sedan, convertible, SUV, cross-over, coupe, etc.), vehicle color, vehicle rating, vehicle reliability, vehicle cost, vehicle age, vehicle location, vehicle information available, vehicle condition, vehicle history, vehicle mileage, vehicle make, vehicle model, vehicle drive type, vehicle fuel type, vehicle transmission, number or type of cylinders, vehicle features, seller information, etc.). The grading engine 113 may apply weights to one or more vehicle attributes based on the extracted user attributes. Based on the applied weights, vehicle grades and/or order may be determined and the vehicle grades may be provided to a user via a vehicle grading platform 118.

The vehicle grading platform 118 may include a visualization module that is configured to provide a visual representation of the vehicle grades. The visual representation may be provided using the user device 105 and may be provided via an application, software, webpage, extension, or the like using the user devices 105. The visual representation may, for example, sort a list of vehicles in order based on their respective vehicle grades such that a pre-determined or dynamically determined number of vehicles are provided on a display screen at a given time. The dynamically determined number of vehicles may be determined based on one or more factors including display size, display resolution, display zoom, etc. The vehicle grading platform 118 may operate more efficiently based on the grades when compared to providing all possible vehicles to a person, as it may expend less resources to provide a subset of the vehicles (e.g., based on their grades), rather than load and then filter all or a large number of vehicles.

The systems and devices of the computing environment 100 may communicate in any arrangement. As will be discussed herein, systems and/or devices of the computing environment 100 may communicate in order to identify a subset of reachable locations and/or to generate graphical interfaces based on the subset of reachable locations.

The user devices 105 may include a computer system such as, for example, a desktop computer, a mobile device, a tablet, a laptop, a haptic device, an oratory device, a wearable device such as a smart watch, smart glasses, etc. In an exemplary embodiment, a user device 105 is a telephone, e.g., a mobile phone, or the like. In some embodiments, the user device 105 may include one or more electronic application(s) (e.g., a program, plugin, etc.), installed on a memory of the user device 105. The electronic applications may be programs such as a distance point tracker, travel planner, location viewer, or the like. In some embodiments, the electronic application(s) may be associated with one or more of the other components in the computing environment 100. For example, the electronic application(s) may include a portal for accessing and/or interacting with one or more of the other components in the computing environment 100.

In various embodiments, the electronic network 125 may be a wide area network ("WAN"), a local area network ("LAN"), personal area network ("PAN"), or the like. In some embodiments, electronic network 125 includes the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 125 includes or is in communication with a telecommunications network, e.g., a cellular network.

Although depicted as separate components in FIG. 1, it should be understood that a component or portion of a component may, in some embodiments, be integrated with or incorporated into one or more other components. For example, the one or more user platform(s) 109 may be accessed by the user device 105 as an electronic portal via an electronic application. At least a portion of the image recognition module 115, text recognition module 111, grading engine 113, and/or clustering module 117 (as further discussed herein) may be part of the same component or may all be implemented within the electronic network 125. Further, it should be understood that data described as stored on a memory of a particular system or device in some embodiments, may be stored in another memory or distributed over a plurality of memories of one or more systems and/or devices in other embodiments. Additionally, or alternatively, some or all of the image recognition module 115, text recognition module 111, and/or grading engine 113 may be part of the same entity that receives data from one or more components (e.g., user device 105 via electronic network 125) and may transmit data to one or more components. The entity may physically house these components in the same or different locations or may access these components via a cloud based connection (e.g., via electronic network 125).

In the implementations described herein, various acts are described as performed or executed by components from FIG. 1. However, it should be understood that in various implementations, various components of the computing environment 100 discussed above may execute instructions or perform acts including the acts discussed herein. Further, it should be understood that in various implementations, one or more steps may be added, omitted, and/or rearranged in any suitable manner.

Figure 2:
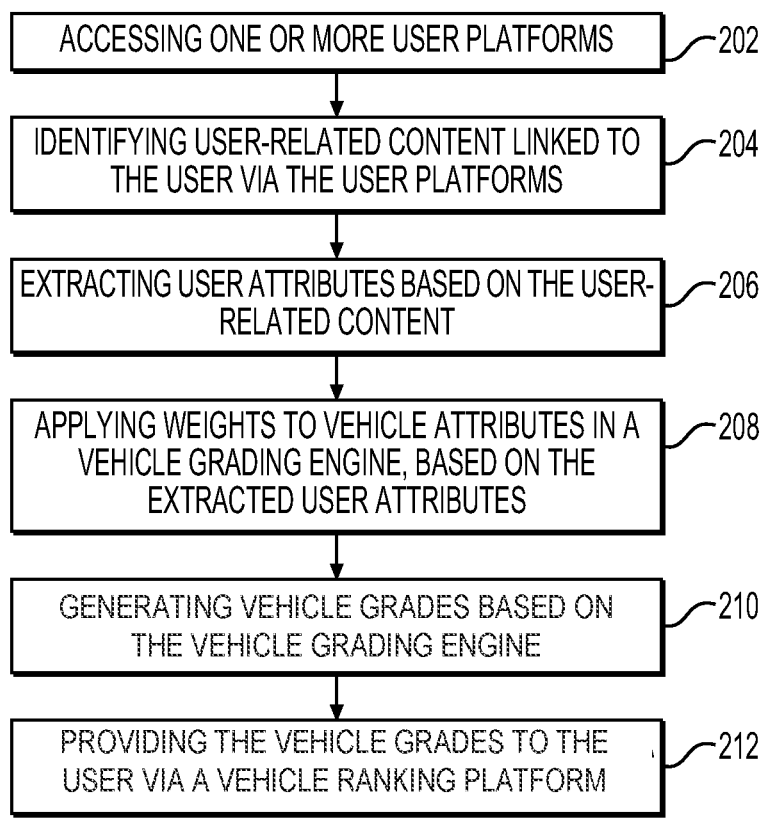
FIG. 2 depicts a flowchart of an exemplary method for generating vehicle grades, according to one or more embodiments.

FIG. 2 illustrates an exemplary process 200 for providing vehicle grades to a user using a vehicle grading platform, such as in the examples discussed above. The process 200 may be implemented based on a request for vehicle grades by a user 103 or may occur periodically (e.g., in the background) such that the results of the process are available to a user 103 at any time (e.g., via user device 105). The results obtained through this process may be updated based on a pre-determined time period or may be determined by an entity or user 103 or may be triggered based on changes (e.g., updates to one or more user platform(s) 109).

At 202, one or more user platform(s) 109 may be accessed. The user platform(s) 109 may be accessed via electronic network 125 and may be accessed by a software, application, cloud service, image recognition module 115, text recognition module 111, and/or grading engine 113. The user platform(s) 109 may be accessed by a user device 105 and may be configured to grant access to one or more of the software, application, cloud service, image recognition module 115, text recognition module 111, and/or grading engine 113. Alternatively, a user 103 may access the one or more software, application, cloud service, image recognition module 115, text recognition module 111, and/or grading engine 113 and provide user credentials (e.g., username, email, password, pin, biometric data, etc.) for the one or more user platform(s) 109 via such a platform, to enable the platform to access the one or more user platform(s) 109.

A user 103 may be able to revoke access to the one or more user platform(s) 109 in a manner similar to or different from the manner in which access was granted. For example, a user 103 may access the one or more user platform(s) 109 via user device 105 to select an option to revoke access to the user platform(s) 109 by the software, application, cloud service, image recognition module 115, text recognition module 111, and/or grading engine 113.

At 204, user-related content linked to the user 103 may be identified via the one or more user platform(s) 109. As disclosed, user-related content linked to the user 103 may be content that is published, recorded, uploaded, captured, promoted, engaged with, interacted with, or tagged by, the user and/or content that the user is tagged in, linked to, or associated with. Examples of user-related content linked to user 103 include, but are not limited to: images uploaded, captured, recorded, published, or the like by user 103; images that the user 103 interacts with (e.g., likes, comments on, views, shares, etc.); images that the user 103 dislikes or otherwise de-emphasizes; text uploaded, published, copied, re-produced, or the like by user 103; text that the user 103 interacts with (e.g., likes, comments on, views, shares, etc.); text that the user 103 dislikes or otherwise de-emphasizes, or the like. It will be understood that user 103 may use a user device 105 to perform any of the actions disclosed herein and that different user devices 105 may be used to perform different actions.

User-related content linked to the user 103 may be identified based on scrapping the one or more user platform(s) 109, receiving metadata associated with the one or more user platform(s) 109, receiving access to tags, or the like. Alternatively, or additionally, images and/or text may be scanned and/or optical character recognition (OCR) techniques may be used to extract the user-related content linked to the user 103. As an example, the image recognition module 115 may access the one or more user platform(s) 109 via the electronic network 125 and may be provided all images linked to the user 103. As another example, the text recognition module 115 may access the one or more user platform(s) 109 via the electronic network 125 and may crawl the one or more user platform(s) 109 to extract any text that is linked to the user 103. The text linked to the user 103 may be identified based on tags, metadata, proximity to the user's content, etc.

According to a variety of implementations of the disclosed subject matter, user-related content may be determined based on a user's connection via the one or more user platform(s) 109. A user 103 may have one or more connections (e.g., friends, acquaintances, colleagues, followers, followed accounts, etc.) that are connected to the user via the one or more user platform(s) 109. Accordingly, content that the one or more connections provides to or interacts with via the one or more user platform(s) 109 may be considered user-related content. As a simplified example, a user 103's spouse may upload a football image. Based on the spouse uploading the football image, the football image may be considered user-related content for the user 103.

The closeness of a given connection may be considered when determining whether content provided by or interacted with a connection should be considered user-related content. Closeness may be determined based on type of relationship, frequency of interaction via one or more user platform(s), duration of interaction, history of interactions, or the like. For example, the number of interactions between a user 103 and a connection within a given week may be used to determine a closeness between the user 103 and the connection. A closeness value may be generated based on the one or more closeness factors and content provided by or interacted with by a connection with a closeness value above a given threshold may be considered user-related.

At 206, user attributes may be extracted based on the user-related content. As disclosed herein, the image recognition module 115, text recognition module 111, grading engine 113, and/or any other applicable component may extract the user attributes from the user-related content. The user attributes may be extracted using a multi-dimensional analysis. A first dimension of the multi-dimensional analysis may include extracting a user attribute based on a single data point (e.g., a content). For example, an image of a dog posted by user 103 may result in a user attribute that the user 103 likes dogs. A second dimension of the multi-dimensional analysis may require two or more data points (e.g., content, context, etc.). Continuing the example, the second dimension, in addition to the posting of the image of the dog, may be that the user joins a rescue dog association group via one of the user platforms 109. The second dimension in addition the first dimension may meet a minimum threshold to extract the user attribute that the user 103 likes dogs. The first dimension (e.g., the user 103 posting a picture of a dog) may not meet the threshold alone as, for example, a user 103 may simply post an image of a dog based on the user 103 meeting a friend's dog for the first time. However, the second dimension (e.g., joining a rescue dog association group) in addition to the first dimension may meet the threshold of extracting the user attribute that the user 103 likes dogs. Although a first and second dimension example is provided herein, it will be understood that a multi-dimensional analysis may include more dimensions based on thresholds. The dimensions and/or thresholds may be determined by a machine learning model that may iteratively update over time and/or based on more data.

According to a variety of implementations, identifying user attributes may include generating a correlation score between the content of a user 103 (e.g., text, images, etc.) and the content of one or more other users. The one or more other users may or may not be connections of the user 103. The content of a user may be a single content item (e.g., an image, a video, text, etc.) or may be a set of multiple content items. The content or set of content of user 103 may be compared to the content or set of content of a plurality of other users (e.g., all users of user platform(s) 109, or a subset of all the users). One or more other users whose correlations score is higher than a correlation threshold may be identified. This process may occur once or multiple times (e.g., chronically based on a time period or when new content is generated, uploaded, etc.). Based on the correlation score being above the correlation threshold, user attributes of user 103 may be determined based on known or determined user attributes of the user whose correlation score is above the correlation threshold. As an example, this technique may be implemented for a user 103 who has limited content or one that infrequently interacts with content via user platform(s) 109.

A single user 103 may have multiple user attributes based on the user-related content associated with the user 103. The multiple attributes may be stored locally or in a remote location (e.g., in a cloud database) accessible via electronic network 125. At 208, the user attributes for a given user 103 may be used to apply weights to vehicle attributes in a vehicle grading engine. For example, the grading engine 113 may be determine and/or receive the user attributes for a user 103 and may apply weights to vehicle attributes based on the user attributes.

A machine learning model may be used to determine the weights to apply to vehicle attributes based on user attributes. The machine learning model may, for example, be trained using supervised data that allows the machine learning model to correlate user attributes to vehicle attributes. For example, past data of vehicle sales and/or satisfied customers may be used where the data may include the vehicle purchased as well as the corresponding customer's user attributes. As a simplified example, the machine learning model may be trained on data that indicates that a user that purchases a Jeep Wrangler also likes dogs, hikes, and outdoor activities in general. Accordingly, the machine learning model may associate such user attributes with vehicle attributes associated with Jeep Wranglers. Multiple iterations of such training of the machine learning model may allow the corresponding trained machine learning model to output weights to be applied to vehicle attributes based on user attributes provided as inputs to the machine learning model.

The weights applied at 208 may be based on affinity levels for one or more extracted user attributes. Determining an affinity level for a given user attribute may be based on or more of a frequency of engagement, a proportion of engagement, a frequency of content generation, a proportion of content generation, and/or the like, for content that each user attribute is based on. For example, a given user attribute (e.g., animal supporter) may be based on images (e.g., pictures of dogs) that the user interacted with. The weights applied at 208 may be greater (e.g., 2×) if there is a larger number of dog pictures that the user uploads or interacts with or lower (e.g., 1.3×) if there is a lower number of dog pictures that the user uploads or interacts with. Accordingly, the affinity level may correspond to the level that a user 103 is involved with user-related content at relates to one or more user attributes. The less involved the user is with user-related content relating to a given user attribute, the lower the weight may be, and vice versa.

According to a variety of implementations, the weights may be applied based on user attributes or user platform 109 text correlating to reviews of vehicles. User attributes or user-related text may include keywords or general concepts that correlate with the reviews of one or more vehicles. Based on such a correlation, the weights may be adjusted to favor or dis-favor that type or category of vehicle.

It will be understood that weights may be applied to a subset of the available vehicle attributes based on user attributes for a given user 103. For example, if a user only has a limited number of user attributes based on limited content available via user platform(s) 109, then weights may be applied to only a subset of available vehicle attributes. The remaining categories may remain at a neutral weight (e.g., 1). It will also be understood that a weight may be a positive weight or a negative weight. Similarly, a weight may be greater than one (e.g., an increased weight) or less than one (e.g., a decreased weight). As an example, a user attribute for a given user 103 may be an indication of a large family. Accordingly, an available vehicle attribute associated with an SUV may receive a weight of 2 whereas an available vehicle attribute associated with a two door convertible may receive a weight of 0.5. It will also be understood that multiple user attributes may result in the same weight being modified. Continuing the previous example, another user attribute may be that the user 103 plays golf. Accordingly, the SUV weight may be further increased by 10% such that it is 2.2, as an SUV can more easily hold golf clubs.

At 210, vehicle grades may be generated. The grading engine 113 may generate the vehicle grades based on the weights applied to the vehicle attributes at 208. The vehicle grades may be for specific vehicles in vehicle database 119 or may be holding spots to be filled in by specific vehicles in vehicle database 119, at 212. For example, at 210, vehicle grades may be generated and may include an ordered list of vehicle attributes to be prioritized above others (e.g., SUV over conversable) as holding spots. These holding spots may be tagged such that applying a vehicle database 119 to the holding spots may enable the tags to match with vehicles in the vehicle database 119, thereby populating the vehicle grades with actual vehicles. The vehicle grades may be populated with vehicles from vehicle database 119 at the grading engine 113, via electronic network 125. Alternatively, the vehicle grades with holding spots may be provided to user device 105 via electronic network 125. The user device 105 may also receive the vehicles in vehicle database 119 via the electronic network 125 and may populate the vehicle grades with actual vehicles at the user device 105.

At 212, the vehicle grades may be provided to the user 103 via a vehicle grading platform 118. The vehicle grading platform 118 may be a software, application, extension, or the like and may be accessed via user device 105. The vehicle grading platform 118 may be the same platform that the user used to provide access to the one or more user platform(s) 109. The vehicle grades may be provided to the user 103 in any applicable format such as a ranked order. The user may be further able to filter the provided vehicle grades. The further filtering may be used to update the vehicle grades.

Figure 3:
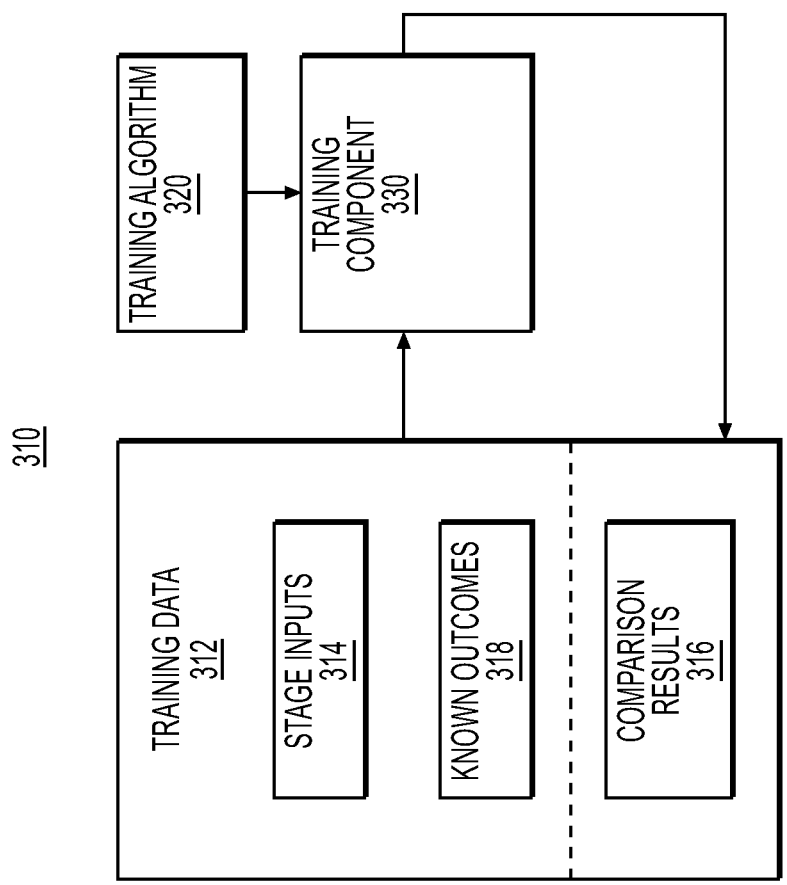
FIG. 3 is a schematic illustration of training an exemplary machine learning model, according to an example of the present disclosure.

As disclosed herein, one or more components of the disclosed subject matter may be implemented using a machine learning model. FIG. 3 shows an example training module 310 to train one or more of the machine learning models disclosed herein. It will be understood that a different training module may be used to train each of the machine learning models disclosed herein and/or a single training module 310 may be used to train two or more machine learning models.

As shown in FIG. 3, training data 312 may include one or more of stage inputs 314 and known outcomes 318 related to a machine learning model to be trained. The stage inputs 314 may be from any applicable source including user platform(s) 109, user attributes, purchasing patterns, preferences, an output from a step (e.g., one or more outputs from a step from process 200 of FIG. 2, flowchart 600 of FIG. 6A, or flowchart 608 of FIG. 6B). The known outcomes 318 may be included for machine learning models generated based on supervised or semi-supervised training. An unsupervised machine learning model may not be trained using known outcomes 318. Known outcomes 318 may include known or desired outputs for future inputs similar to or in the same category as stage inputs 314 that do not have corresponding known outputs.

The training data 312 and a training algorithm 320 may be provided to a training component 330 that may apply the training data 312 to the training algorithm 320 to generate a machine learning model. According to a variety of implementations, the training component 330 may be provided comparison results 316 that compare a previous output of the corresponding machine learning model to apply the previous result to re-train the machine learning model. The comparison result 316 may be used by the training component 330 to update the corresponding machine learning model. The training algorithm 320 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

Figure 4:
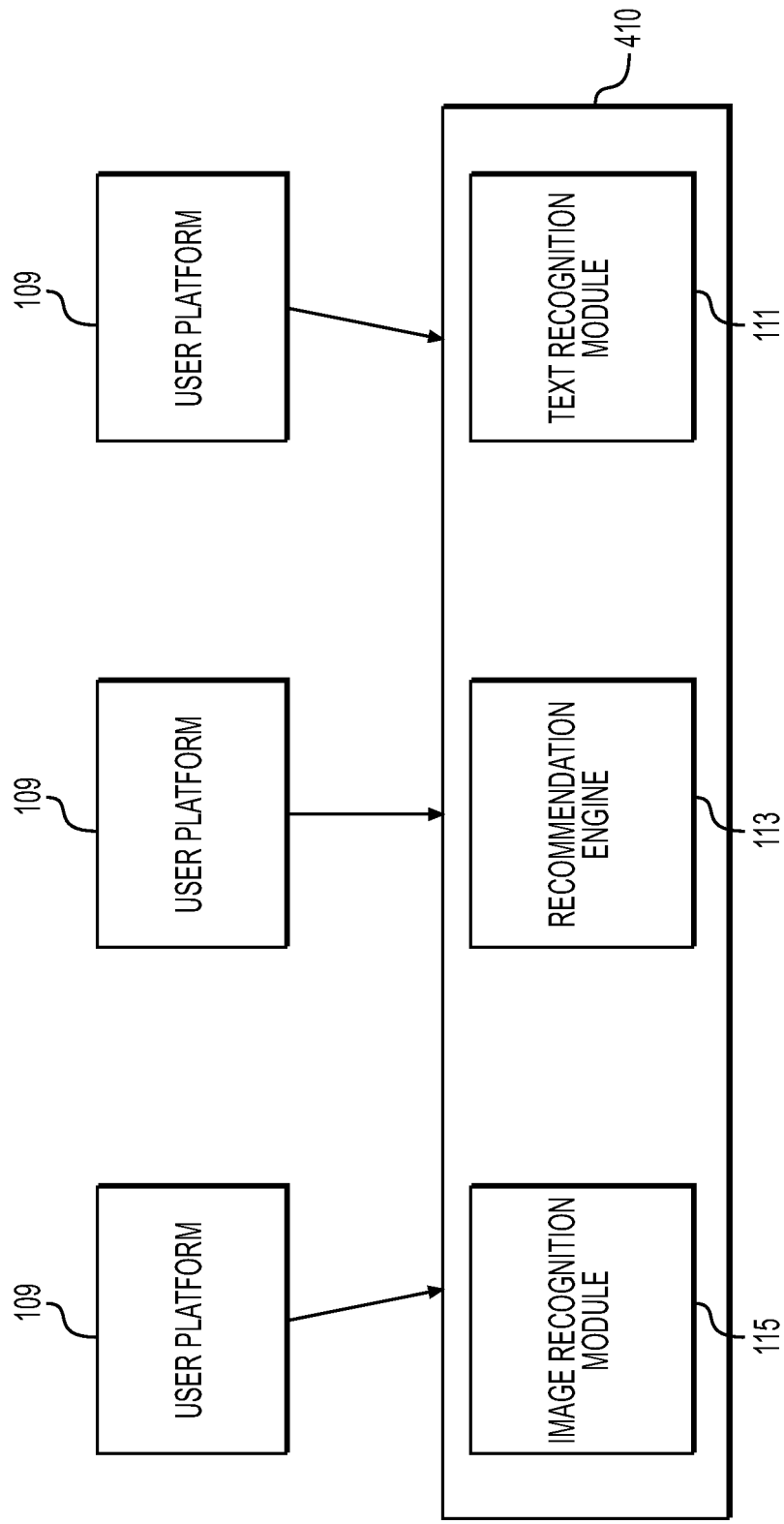
FIG. 4 depicts an exemplary multi-platform environment, according to one or more embodiments.

FIG. 4 shows a plurality of user platforms 109. An example vehicle grading platform 118 may be associated with the image recognition module 115, grading engine 113, and text recognition module 111, as shown in FIG. 4. The vehicle grading platform 410 may receive user-related content from each of the plurality of user platforms 109. According to a variety of implementations, weights applied to vehicle attributes at 208 of FIG. 2 may be adjusted based on the specific user platform that the corresponding user attribute that caused the application of the weight is based on. For example, a user attribute from a first user platform may correspond to a greater weight than the same user attribute from a second user platform. The difference in weights based on user platforms may be based on a user's use of a given user platform, a user's preference of a given user platform, the type of content or context associated with a give user platform, or the like. According to a variety of implementations, the system may be user platform agnostic such that user attributes from any user platform 109 may result in the same weight treatment.

Figure 5:
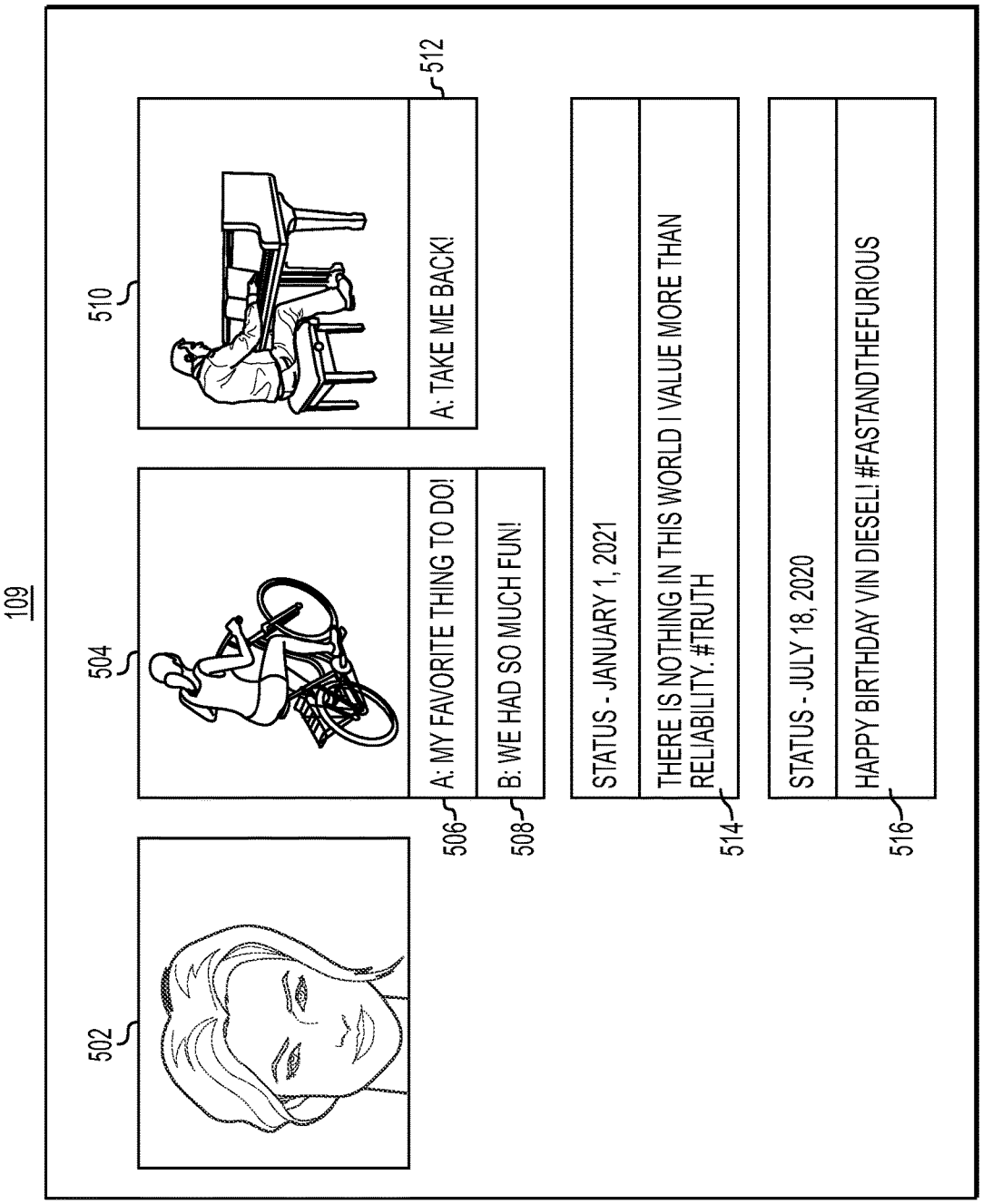
FIG. 5 depicts an exemplary user platform, according to one or more embodiments.

FIG. 5 shows an example user platform 109 interface. The user platform 109 may include a user representative image 502. The user representative image 502 may be selected by user 103 to be representative of the user 103 via the user platform 109. Accordingly, a user attribute determined in whole or in part based on the user representative image 502 may be weighted greater than other content as the user representative image 502 may most closely mirror the user's preferences.

Additional content such as images 504 and 510 may be associated with the user. The images 504 and 510 may be user provided or may be content that the user engages with. Similarly, text 506, 508, and 512 may be associated with images 504 and 510 and may be used as, for example, second dimension content in addition to the images 504 and 510's first dimension content, as disclosed herein. Texts 514 and 516 may be intendent of any images and may be statuses provided by user 103. The content of the texts may be used to determine user attributes. As a simplified example, text 514 mentions reliability and, accordingly, a user attribute associated with reliability may be identified. Accordingly, a weight may be applied to a vehicle attribute associated with vehicle reliability.

It should be understood that embodiments in this disclosure are exemplary only, and that other embodiments may include various combinations of features from other embodiments, as well as additional or fewer features.

Figure 6A:
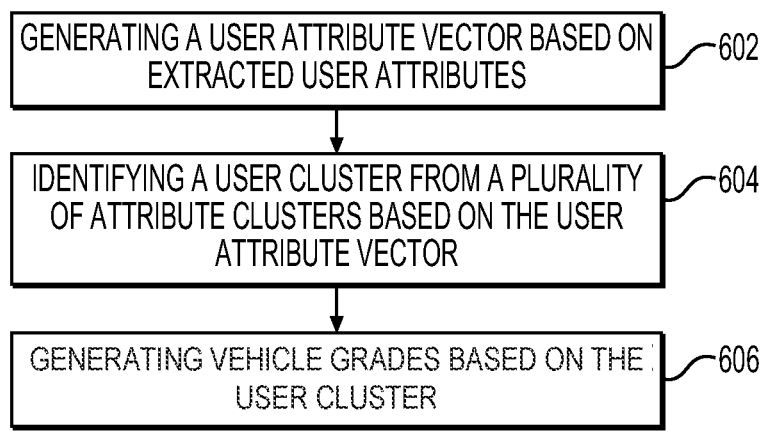
FIG. 6A depicts a flowchart of an exemplary method for generating vehicle grades based on a user cluster, according to one or more embodiments.

FIG. 6A depicts a flowchart 600 for generating vehicle grades based on user clusters. At 602, a user attribute vector may be determined based on extracted user attributes at 206 of FIG. 2. The user attribute vector may be based on a combination of user attributes associated with a user 103. Additionally, the user attribute vector may include an amplitude for a degree associated with each respective user attribute represented by the user vector. Although a two dimensional user attribute vector is discussed herein for simplicity, it will be understood that the user attribute vector may have three or more dimensions (e.g., a multi-dimensional matrix) and may represent a plurality of user attributes via the multi-dimensionality.

A user cluster from a plurality of attribute clusters may be identified based on the user attribute vector, via a clustering module 117. The user cluster may be the cluster that is closest to the user attribute vector. FIG. 7 shows a simplified visual representation of a plurality of attribute clusters 702, 704, each attribute cluster having a plurality of general attribute vectors 702A. The general attribute vectors 702A may be actual attribute vectors from other users or may be numerical representations of possible attribute vectors. At 604 of FIG. 6A, the user attribute vector 706, determined at 602, may be compared to the plurality of attribute clusters 702, 704 to determine which attribute cluster of the plurality of attribute clusters 702, 704 the user attribute vector 706 corresponds to. As shown in FIG. 7, attribute cluster 704 may be most closely matched with the user attribute vector 706 and, accordingly, attribute cluster 704 may be identified at 604 as the user cluster corresponding to the user attribute vector 706. According to a variety of implementations, the user attribute vectors may correspond to a user 103's connections via user platform(s) 109.

Accordingly, based on the implementation described in FIGS. 6A and 7, content from one or more user platform(s) 109 may be used to extract user attributes, as disclosed herein. The user attributes may be used to generate a user attribute vector (e.g., user attribute vector 706 of FIG. 7) that represents the one or more user attributes. The user attribute vector may be compared to other attribute vectors (e.g., from other users or theoretical users) to determine the attribute cluster closest to the user attribute vector. This closest attribute cluster may be designated the user cluster.

According to a variety of implementations, the weights applied at 208 of FIG. 2 may be applied based on the weights associated with the user cluster. For example, each user cluster may have pre-determined weights for vehicle attributes associated with that cluster. Upon identifying a user cluster based on the user attribute vector, the weights associated with that user cluster may be applied at 208 of FIG. 2 to the vehicle attributes such that vehicle grades are generated based on the weights at 606 of FIG. 6A. According to a variety of implementations, the vehicle grades generated at 210 may be directly generated based on the identified user cluster such that the vehicle grades may be determined for each of the available attribute clusters and by identifying a given attribute cluster as the user cluster, the vehicle grades associated with that cluster may be generated at 606 of FIG. 6A.

Figure 6B:
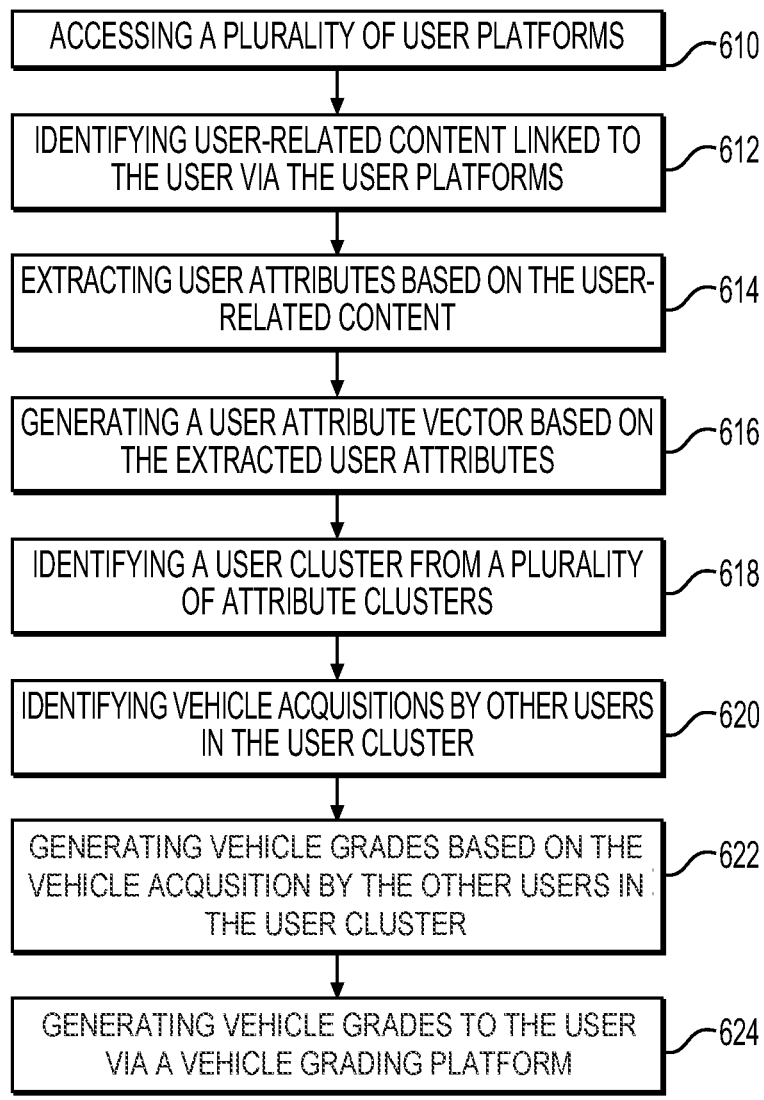
FIG. 6B depicts another flowchart of an exemplary method for generating vehicle grades, according to one or more embodiments.

FIG. 6B depicts a flowchart 608 for generating vehicle grades. At 610, a plurality of user platform(s) 109 may be accessed as disclosed herein. At 612, user-related content linked to the user via the user platform(s) 109 may be identified. At 614, user attributes may be extracted based on the user-related content. 610, 612, and 614 of FIG. 6B are similar to 202, 204, and 206 of FIG. 2 and, accordingly, related disclosure is not repeated herein for brevity.

At 616, a user attribute vector may be generated as disclosed at 602 of FIG. 6A. The user attribute vector may be based on the user attributes extracted at 614. At 618, a user cluster from a plurality of attribute clusters may be identified as disclosed at 604 of FIG. 6A. At 620, vehicle acquisitions by other users in the user cluster may be identified. A vehicle acquisition, as applied herein, may be any overt vehicle selection and may include, but is not limited to, a vehicle purchase, a vehicle lease, a vehicle rental, a vehicle favorite, a vehicle test drive, a vehicle save, or the like. Therefore, at 620, a user cluster may include one or more other vectors corresponding to other users that have user attributes similar to a given user 103. Additionally, information related to vehicle acquisitions by other users in the user cluster may be identified at 620.

At 622, vehicle grades may be generated based on the vehicle acquisitions of 620 by the other users in the user cluster of 618. According to a variety of implementations, the vehicle grades may be based on weights applied to the vehicle attributes, as disclosed herein for 208 of FIG. 2. The weights may be based on the vehicle acquisitions of 620 by the other users in the user cluster of 618. For example, if a user cluster includes multiple users who acquired mini-vans, then the weight associated with a mini-van vehicle type may be increased. At 624, the vehicle grades may be provided to the user via a vehicle grading platform, as disclosed at 212 of FIG. 2.

The disclosed subject matter reduces the processing capability required to receive and display all available vehicle recommendations to a user. Rather, by applying the techniques disclosed herein, a user device may receive only a subset of the available options based on the vehicle grades, as provided herein. Accordingly, the load on a user device may be reduced while both receiving the subset of options and/or displaying the subset of options. The techniques disclosed herein may also provide faster processing as a result of the reduced number of options.

In general, any process or operation discussed in this disclosure that is understood to be computer-implementable, such as the process illustrated in FIGS. 2, 6A and 6B, may be performed by one or more processors of a computer system, such any of the systems or devices in the computing environments of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. One or more processors of a computer system may be connected to a data storage device. A memory of the computer system may include the respective memory of each computing device of the plurality of computing devices.

Figure 8:
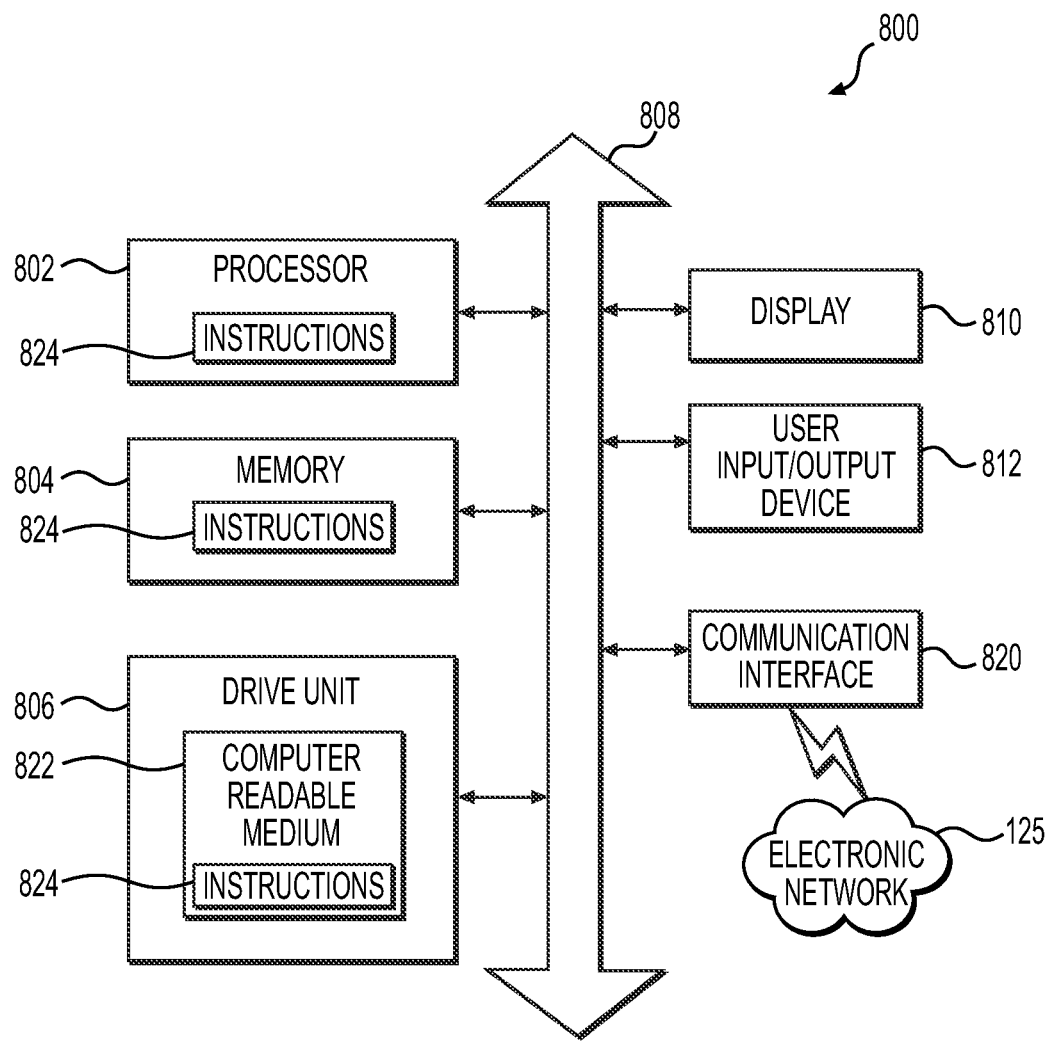
FIG. 8 depicts an example of a computing device, according to one or more embodiments.

FIG. 8 is a simplified functional block diagram of a computer system 800 that may be configured as a device for executing the methods of FIGS. 2, 6A and 6B, according to exemplary embodiments of the present disclosure. FIG. 8 is a simplified functional block diagram of a computer system that may generate interfaces and/or another system according to exemplary embodiments of the present disclosure. In various embodiments, any of the systems (e.g., computer system 800) herein may be an assembly of hardware including, for example, a data communication interface 820 for packet data communication. The computer system 800 also may include a central processing unit ("CPU") 802, in the form of one or more processors, for executing program instructions. The computer system 800 may include an internal communication bus 808, and a storage unit 806 (such as ROM, HDD, SSD, etc.) that may store data on a computer readable medium 822, although the computer system 800 may receive programming and data via network communications. The computer system 800 may also have a memory 804 (such as RAM) storing instructions 824 for executing techniques presented herein, although the instructions 824 may be stored temporarily or permanently within other modules of computer system 800 (e.g., processor 802 and/or computer readable medium 822). The computer system 800 also may include input and output ports 812 and/or a display 810 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, a mobile device, a wearable device, an application, or the like. Also, the presently disclosed embodiments may be applicable to any type of Internet protocol.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for determining vehicle grades for a user, the method comprising:
    accessing a plurality of user platforms;
    identifying user-related content linked to the user via the user platforms;
    extracting user attributes based on the user-related content by:
        receiving user images associated with the user-related content;
        determining one or more image attributes of the user images, the one or more image attributes including content of the user images determined by performing image recognition on the user images;
determining context associated with the user images;
applying the one or more image attributes of the user images and the context associated with the user images to a machine-learning model, the machine-learning model trained to identify user attributes based on both the one or more image attributes of the user images and the context associated with the user images to output the user attributes; and
receiving, from the machine-learning model, the outputted user attributes;
applying weights to vehicle attributes in a vehicle grading engine, based on the outputted user attributes;
generating the vehicle grades based on the weights; and
providing the vehicle grades to the user via a vehicle grading platform.

2. The computer-implemented method of claim 1, further comprising generating a user attribute vector based on the outputted user attributes.

3. The computer-implemented method of claim 2, further comprising identifying a user cluster from a plurality of attribute clusters, wherein the user cluster is most closely related to the user attribute vector when compared to the plurality of attribute clusters.

4. The computer-implemented method of claim 3, further comprising determining the weights for the vehicle attributes based on vehicle acquisitions by other users in the user cluster.

5. The computer-implemented method of claim 1, wherein applying the weights comprises determining affinity levels for one or more of the outputted user attributes and determining a weight value based on the affinity levels.

6. The computer-implemented method of claim 5, wherein determining the affinity level comprises determining at least one of a frequency of engagement, a proportion of engagement, a frequency of content generation, or a proportion of content generation.

7. The computer-implemented method of claim 1, wherein accessing the plurality of user platforms comprises obtaining user permission to access the plurality of user platforms.

8. The computer-implemented method of claim 7, wherein obtaining the user permission comprises requesting the user permission via the vehicle grading platform.

9. The computer-implemented method of claim 1, wherein determining context associated with the user images further comprises:
receiving user text associated with the user; and
determining content of the user text using a contextual engine.

10. The computer-implemented method of claim 9, further comprising:
generating a correlation score between the content of the user text to the content of a plurality of other users;
identifying one or more other users who's correlation score is higher than a correlation threshold; and
identifying the user attributes further based on attributes of the one or more other users who's correlation score is higher than the correlation threshold.

11. The computer-implemented method of claim 9, further comprising:
determining a correlation score between the content of the user text to vehicle reviews for a plurality of vehicles;
identifying one or more vehicles with vehicle review correlation scores higher than a correlation threshold; and
applying the weights to the vehicle attributes also based on the vehicles with vehicle correlation scores higher than the correlation threshold.

12. The computer-implemented method of claim 1, further comprising updating the weights for the vehicle attributes based on user activity.

13. The computer-implemented method of claim 1, wherein the user-related content comprises associated content related to the user's associates, and further comprising:
extracting associated attributes based on the associated content; and
applying the weights to vehicle attributes based also on the extracted associate attributes.

14. A system, comprising:
a memory storing processor readable instructions; and
at least one processor configured to access the memory and execute the processor readable instructions, which when executed by the at least one processor, configures the at least one processor to perform a plurality of functions, including functions for:
accessing a plurality of user platforms;
identifying user-related content linked to the user via the user platforms;
extracting user attributes based on the user-related content by:
receiving user images associated with the user-related content;
determining one or more image attributes of the user images, the one or more image attributes including content of the user images determined by performing image recognition on the user images;
determining context associated with the user images;
applying the one or more image attributes of the user images and the context associated with the user images to a machine-learning model, the machine-learning model trained to identify user attributes based on both the one or more image attributes of the user images and the context associated with the user images to output the user attributes; and
receiving, from the machine-learning model, the outputted user attributes;
applying weights to vehicle attributes in a vehicle grading engine, based on the outputted user attributes;
generating the vehicle grades based on the weights; and
providing the vehicle grades to the user via a vehicle grading platform.

15. The system of claim 14, the plurality of functions further including:
generating a user attribute vector based on the outputted user attributes.

16. The system of claim 15, the plurality of functions further including:
identifying a user cluster from a plurality of attribute clusters, wherein the user cluster is most closely related to the user attribute vector when compared to the plurality of attribute clusters.

17. The system of claim 16, the plurality of functions further including:
determining the weights for the vehicle attributes based on vehicle acquisitions by other users in the user cluster.

18. A non-transitory computer readable storage medium storing instructions to control one or more processors to perform operations, including:
accessing a plurality of user platforms;
identifying user-related content linked to the user via the user platforms;

extracting user attributes based on the user-related content by:
  receiving user images associated with the user-related content;
  determining one or more image attributes of the user images, the one or more image attributes including content of the user images determined by performing image recognition on the user images;
  determining context associated with the user images;
  applying the one or more image attributes of the user images and the context associated with the user images to a machine-learning model, the machine-learning model trained to identify user attributes based on both the one or more image attributes of the user images and the context associated with the user images to output the user attributes; and
  receiving, from the machine-learning model, the outputted user attributes;
applying weights to vehicle attributes in a vehicle grading engine, based on the outputted user attributes;
generating the vehicle grades based on the weights; and
providing the vehicle grades to the user via a vehicle grading platform.

19. The non-transitory computer readable storage medium of claim 18, wherein determining context associated with the user images further comprises:
  receiving user text associated with the user; and
  determining content of the user text using a contextual engine.

20. The non-transitory computer readable storage medium of claim 18 storing further instruction to control the one or more processors to:
  determining a correlation score between the content of the user text to vehicle reviews for a plurality of vehicles;
  identifying one or more vehicles with vehicle review correlation scores higher than a correlation threshold; and
  applying the weights to the vehicle attributes also based on the vehicles with vehicle correlation scores higher than the correlation threshold.

* * * * *